United States Patent
Nakagawa et al.

[11] Patent Number: 6,144,124
[45] Date of Patent: *Nov. 7, 2000

[54] THIN DC BRUSHLESS MOTOR HAVING AN AIR GAP FORMED THEREIN

[75] Inventors: Fujio Nakagawa; Yoshihisa Katoh, both of Yonago, Japan

[73] Assignee: Matsushita Electric Industrial Co., Ltd., Osaka-Fu, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/838,255

[22] Filed: Apr. 17, 1997

[30] Foreign Application Priority Data

Apr. 19, 1996 [JP] Japan ................................ 8-098259

[51] Int. Cl.7 .................................................. H02K 29/00
[52] U.S. Cl. ..................................... 310/67 R; 360/99.04; 360/99.08
[58] Field of Search ....................... 310/67 R; 360/99.07, 360/98.09, 49.04, 99.05, 99.08

[56] References Cited

U.S. PATENT DOCUMENTS 5,382,853  1/1995  Von Der Heide ..................... 310/67 R

FOREIGN PATENT DOCUMENTS 6-078507  3/1994  Japan ..................................... 310/67 R
7-245902  9/1995  Japan ..................................... 310/67 R
7-264830  10/1995  Japan ..................................... 310/67 R

*Primary Examiner*—Karl Eizo Tamai
*Attorney, Agent, or Firm*—Wenderoth, Lind & Ponack, L.L.P.

[57] ABSTRACT

A thinned DC brushless motor (50) has a base plate 52 of magnetic material, a rotatable shaft (58) supported perpendicular to the base plate, an annular hub (68) coaxially fixed on the shaft, a stator (60) fixed on the base plate, and a rotor (70) coaxially fixed on the shaft through the annular hub. The rotor (70) includes an first wall portion (72) extended radially from the shaft above the stator and parallel to the base plate and a second wall portion (74) extended from a peripheral edge of the circular potion towards the base plate to enclose the stator. An annular magnet (78) is fixed on an inner surface of the second wall of the rotor with leaving a small gap from a peripheral edge of the stator. The upper wall has a bent portion (80) extended outward away from the annular magnet in the vicinity of an inner edge of the annular magnet.

4 Claims, 3 Drawing Sheets

THIN DC BRUSHLESS MOTOR HAVING AN AIR GAP FORMED THEREIN

FIELD OF THE INVENTION

The invention relates to a DC brushless motor preferably for use in a floppy disc operating system, and more particularly to an outer-rotor, radial-gap type DC brushless motor.

BACKGROUND OF THE INVENTION

There has been disclosed a thin DC brushless motor for use in a floppy disk operating system in, for example, Japanese Utility Model Laid-Open Publication (Jikkaihei) 7-3283.

One known DC brushless motor is shown in FIG. 5. The DC brushless motor generally indicated by reference numeral 10 comprises a board 12 which is made of magnetic material. The board 12 has a circular opening 14 in which an annular bearing-housing 16 is securely inserted. The bearing housing 16 holds a bearing ring 18 at its inner periphery, by which a shaft 20 is rotatably supported perpendicular to the board 12.

An annular stator core 22 is coaxially secured on the bearing housing 16 by a plurality of screws 24. The stator core 22 has a plurality of projections 26 extending outwardly radially, around each of which an exciting coil 28 is wound. The shaft 20 holds an annular hub 30 coaxially to which a cup-like rotor frame 32 is supported to enclose the stator core 22. The rotor frame 32 has an annular hub magnet 34 located coaxially on its upper surface and an annular rotor magnet 36 on its peripheral inner surface while leaving a small gap from the distal ends of the projections 26. The rotor frame 32 has a magnet 38 at its circumferential edge for detecting a rotational frequency of the motor.

In addition, the board 12 has a slot 40 extending along the rotor magnet 36 so that a magnetic flux from the rotor magnet 36 is concentrated on the stator core 22.

Japanese Utility Model Laid-Open Publication (Jikkaihei) 4-80248 discloses another thin DC brushless motor in which a plurality of radially extended ribs are provided on the rotor frame to increase the strength thereof.

In these thin DC brushless motors, although a surface-opposing structure is mainly employed in the motor to increase an output torque thereof, it is preferable to employ a radial-gap structure from an economical point of view. However, the radial-gap structure must to decrease the number of the layers of the stator core to reduce the thickness of the motor. Therefore, to keep the output torque of the motor at a certain level, it is necessary to provide a member opposing the rotor magnet with a portion for preventing the magnetic flux from flowing into the opposing member, which adversely decreases both productivity and strength of the motor.

SUMMARY OF THE INVENTION

Therefore, an object of the invention is to provide a thin radial-gap DC brushless motor which can be manufactured inexpensively and elaborately and can provide a large torque.

Accordingly, a thin DC brushless motor of the invention includes a base plate made of magnetic material, a rotatable shaft extending perpendicular to the base plate, an annular hub coaxially fixed on the shaft, a stator fixed on the base plate, and a rotor coaxially fixed on the shaft through the annular hub.

The rotor has a first wall extending radially from the shaft above the stator and parallel to the base plate and a second wall extending from a peripheral edge of the first wall towards the base plate to enclose the stator. The motor further includes an annular magnet fixed on an inner surface of the second wall of the rotor. In addition, a small gap exists between the peripheral edge of the stator and the annular magnet.

Advantageously, the first wall has a bent portion extending outwardly away from the annular magnet in the vicinity of an inner edge of the annular magnet.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following descriptions, like parts are designated by like reference numbers throughout the several drawings.

DESCRIPTION OF THE PREFERRED EMBODIMENTS

Figure 1:
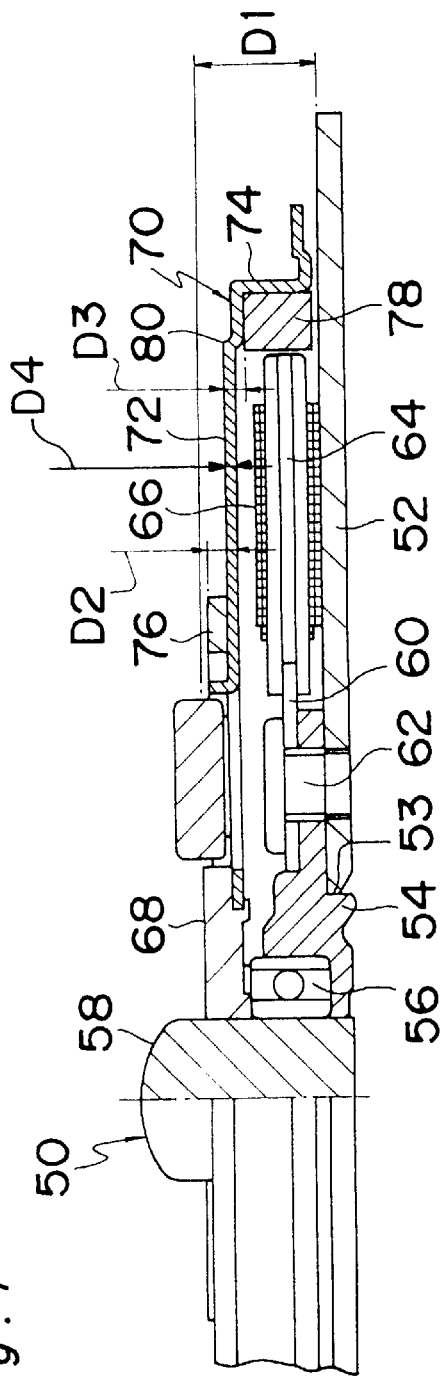
FIG. 1 is an enlarged cut-away side elevational view of a thin DC brushless motor of the invention.

With reference to FIG. 1, a thin DC brushless motor of the invention, generally indicated by reference numeral 50, includes a base plate, or printed board 52, made of magnetic material. The board 52 has a round opening 53 in which an annular bearing-housing 54 is securely inserted. The bearing housing 54 holds a bearing ring 56 at its inner periphery, by which a shaft 58 is rotatably supported perpendicular to the board 52. An annular stator core 60, which is preferably formed with a plurality of metal layers, is secured coaxially on the bearing housing 54 by a plurality of screws 62. The stator core 60 has a plurality of projections 64 extending outwardly and radially, around each of which an exciting coil 66 is wound. The shaft 58 holds an annular hub 68 to which a cup-like rotor or rotor frame 70 is supported to enclose the stator core 60 on the board 52. The rotor frame 70 has a circular upper wall 72 which extends parallel to the board 52 above the stator core 60 and a peripheral wall 74 which extends from a peripheral edge of the upper wall 72 towards the board 52. The rotor frame 70 has an annular hub magnet 76 on the upper wall 72 and an annular rotor magnet 78 along an inner periphery of the peripheral wall 74. Additionally, a small gap exists between the peripheral ends of the projections 64 and the rotor magnet 78.

The thin DC brushless motor 50 thus constructed, when it is used in half-inch height and 15 millimeters height floppy disk operating systems, requires a distance D1 from an upper surface of the board 52 to the upper surface of the hub 68 to be 4.5 millimeters or less. To satisfy this dimensional requirement and to provide the motor with an aimed torque characteristic, the stator core 60 needs to have at least three layers.

Also, if a distance D2 from a lower surface of the upper wall 72 of the rotor frame 70 to an upper surface of the hub magnet 76 is 0.5 millimeters, the thickness D4 of the upper wall 72 of the rotor frame 70 should be 0.3 to 0.4 millimeters, e.g., 0.4 millimeters in this embodiment, because the rotor frame 70 needs a thickness of at least 0.2 millimeters to bear a magnetic thrust force and the like.

Preferably, a Nd—Fe—B bonded magnet is used for the rotor magnet 78 from economical and energy points-of-view. Further, to concentrate a magnetic flux of the rotor magnet 78 on the stator core 60 and to prevent the magnetic flux from adversely flowing into the upper wall 72 of the rotor frame 70, the upper wall 72 has a bent portion 80 which extends annularly in a coaxial relationship with the shaft 58 away from the rotor magnet 78 in the vicinity of an inner peripheral top edge of the rotor magnet 78, or in other words a radial distance from the shaft to the bent portion is substantially equal to a radial distance from the shaft to the annular magnet. Thus, with respect to an axial direction of the shaft 58, an air gap D3 is formed between the inner surface of the upper wall 72 and an upper surface of the rotor-magnet 78.

Figure 3:
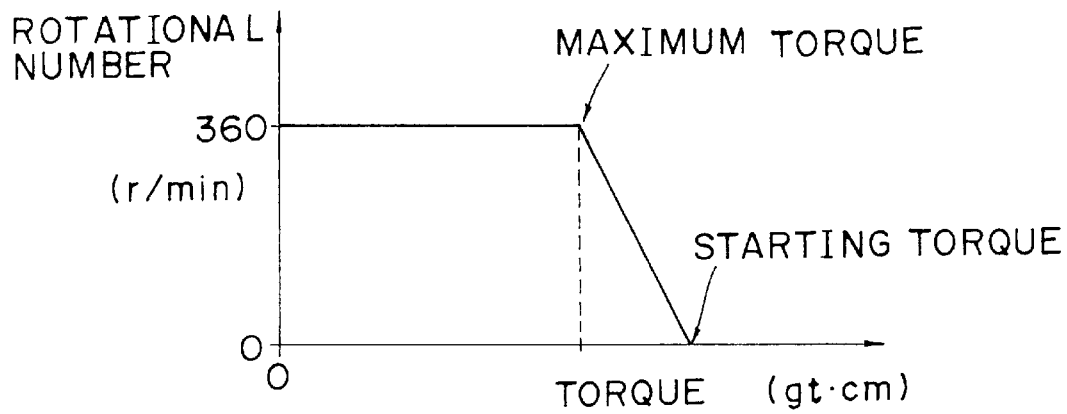
FIG. 3 is a graph showing a rotational number versus torque curve of the motor.
Figure 4:
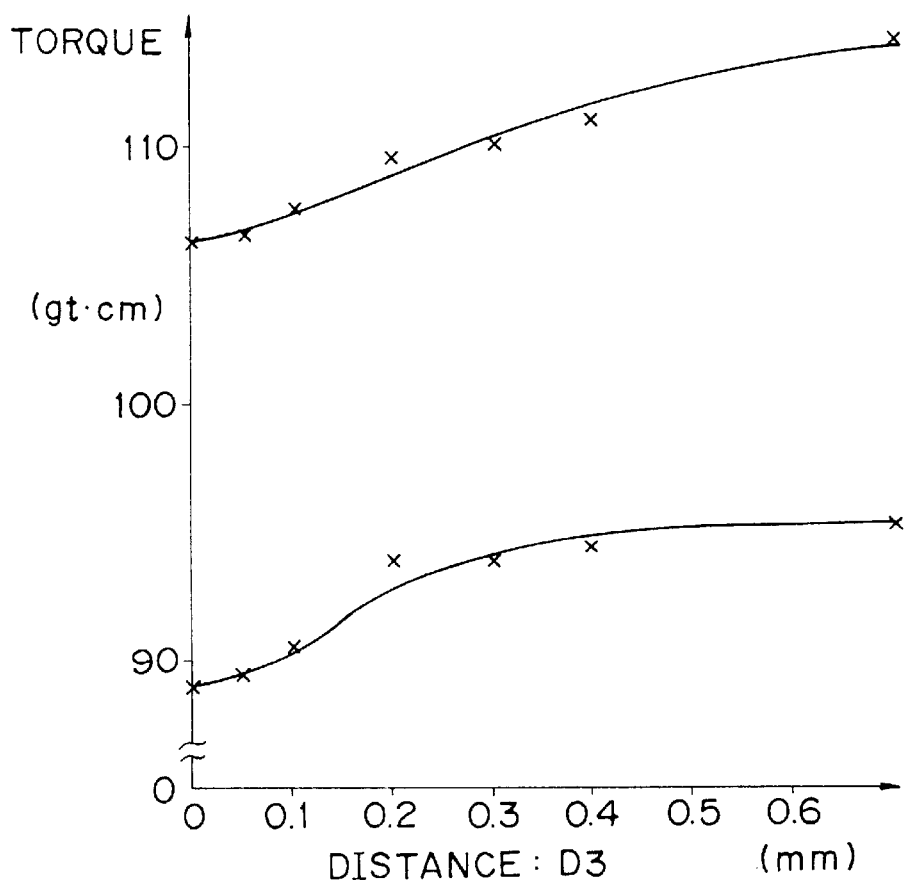
FIG. 4 is a graph showing starting and maximum torques of the motor.
Figure 5:
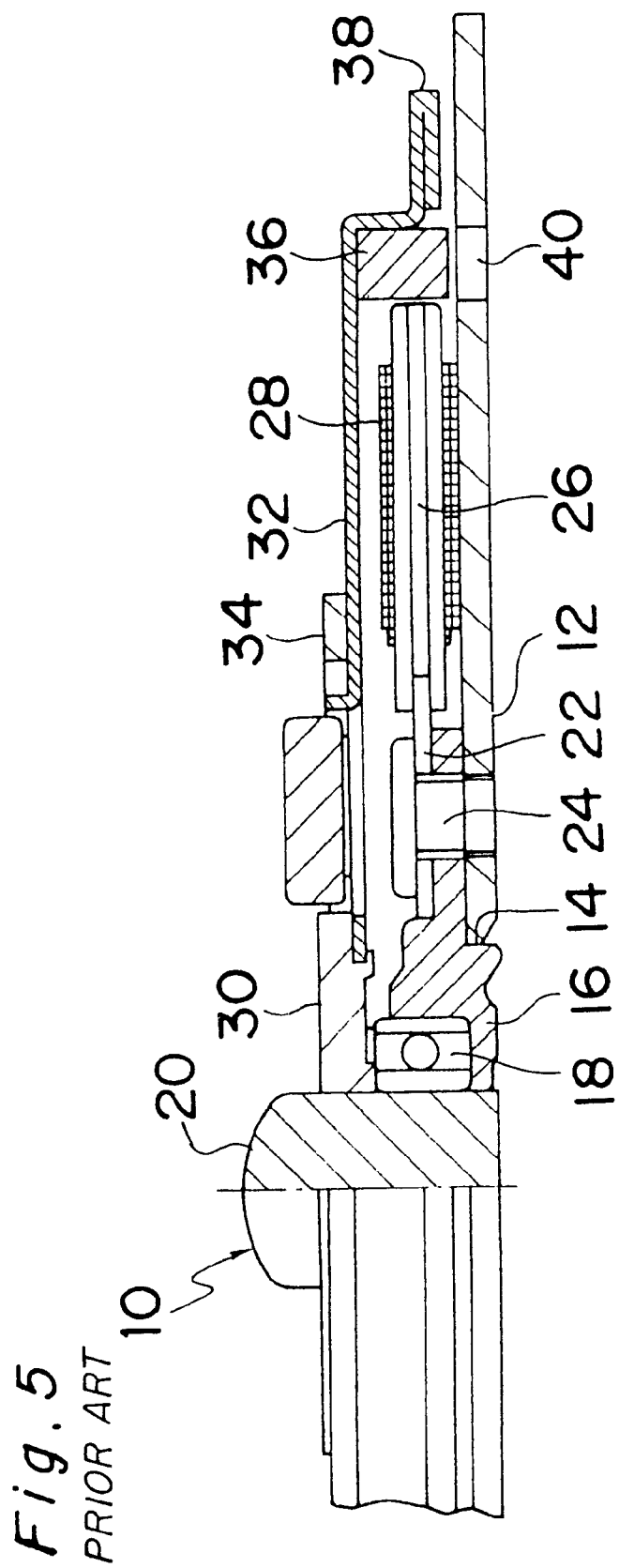
FIG. 5 is an enlarged cut-away side elevational view of a conventional DC brushless motor.

Maximum and starting torques (see FIG. 3) of the motor 50 were evaluated with respect to a thickness of the air gap D3. The result is shown in FIG. 4. This shows that, if the thickness of the gap D3 is greater than 0.1 millimeter, both torques increase as the thickness is enlarged. Also, the maximum torque does not increase if the thickness is greater than 0.4 millimeters.

The bent portion provides another advantage with the motor. Especially, the rotor magnet 78 will not crack even if it suffers a shock during assembly when it is inserted into the rotor frame 70 because it is protected by the inner peripheral surface of the peripheral wall 74, which allows utilization of an inexpensive assembling device.

Also, it is not necessary to form a slot along the rotor magnet 78 as with in the conventional DC brushless motor described in the background of the invention. This allows the rotor magnet 78 to have a magnetic variation for detecting a rotational frequency of the rotor frame 70. Therefore, it is not necessary to provide a magnet on the rotor frame 70 which is exclusively used for detecting the frequency of the rotor frame.

As described above, in the DC brushless motor of the invention, the rotor frame has the annular bent portion which forms the air gap, resulting in an inexpensive thin DC brushless motor having a large torque.

Figure 2:
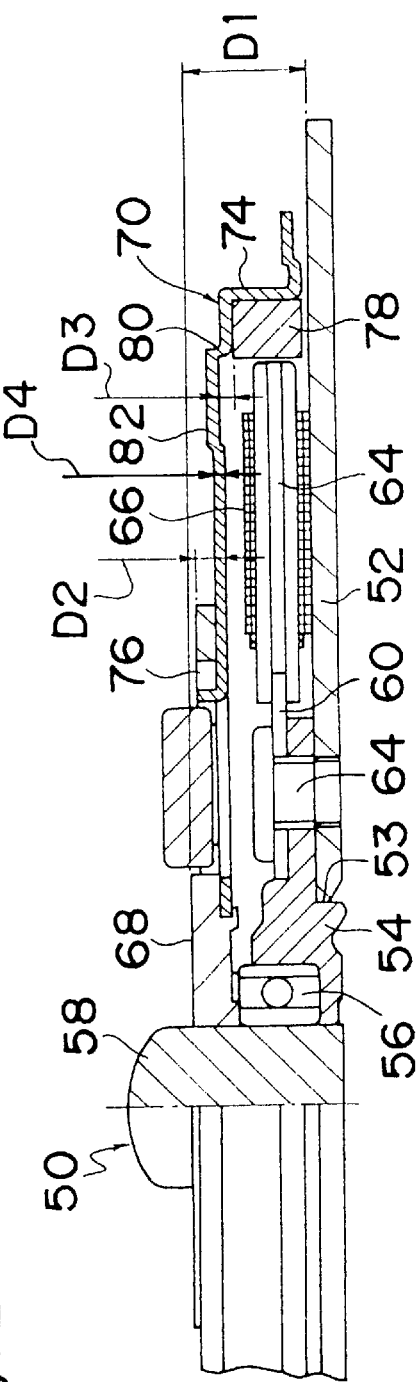
FIG. 2 is an enlarged cut-away side elevational view of the thin DC brushless motor of the second embodiment in which a convex portion is formed annularly in a rotor frame.

FIG. 2 shows a modification of the thin DC brushless motor of the invention which is similar to the first embodiment. The only different is that the rotor frame has an annular convex portion 82 adjacent and along the rotor magnet 78 forming the space gap for preventing the magnetic flux of the rotor magnet 78 from flowing into the rotor frame 70.

Advantageously, the bent or convex portion formed in the rotor frame contributes to an increase in the rigidity of the frame, which reduces an unwanted vibration of the rotor frame.

In addition, the bent or convex portion is not extended radially, which prevents the magnetic flux from flowing into the rotor frame and thereby ensures that the motor can be provided with a desired torque.

Although the present invention has been fully described by way of examples with reference to the accompanying drawings, it is to be noted that various changes and modifications will be apparent to those skill in the art. Therefore, unless such changes and modifications depart from the scope of the present invention, they should be construed as being included therein.

What is claimed is:

1. A thin brushless motor comprising:

a magnetic base plate having an inner surface;

a rotatable shaft supported perpendicular to said base plate;

a stator fixed to said base plate;

an annular hub coaxially fixed to said shaft and having an outer surface facing away from said inner surface of said base plate, an axial distance from said inner surface of said base plate to said outer surface of said hub being approximately 4.5 millimeters;

a rotor coaxially fixed to said annular hub and comprising a first wall and a second wall, said first wall being approximately 0.3–0.4 millimeters thick and having an inner surface facing said stator and extending radially from said annular hub and parallel to said base plate, said second wall having an inner surface and extending from an outer periphery of said first wall toward said base plate thereby enclosing said stator within said first wall, said second wall and said base plate; and an annular magnet having an inner surface and an adjacent upper surface facing away from said base plate, said annular magnet being fixed to said inner surface of said second wall, said annular magnet facing an outer periphery of said stator across a gap;

wherein an annular bent portion is formed in said first wall immediately adjacent to said annular magnet such that said annular bent portion is axially aligned with said inner surface of said annular magnet, thereby creating an air gap which extends to said annular magnet and has a thickness defined as a distance between a plane including said upper surface of said annular magnet and said first wall, said air gap thickness being 0.1–0.4 millimeters.

2. The thin brushless motor of claim 1, wherein: said thin brushless motor is a DC motor.

3. The thin brushless motor of claim 1, wherein:

an annular convex portion is formed coaxially with said shaft in said first wall of said rotor; and said bent portion constitutes a portion of said convex portion.

4. A thin brushless motor comprising:

a magnetic base plate having an inner surface;

a rotatable shaft supported perpendicular to said base plate;

a stator fixed to said base plate;

an annular hub coaxially fixed to said shaft and having an outer surface facing away from said inner surface of said base plate, an axial distance from said inner surface of said base plate to said outer surface of said hub being approximately 4.5 millimeters;

a rotor coaxially fixed to said annular hub and comprising a first wall and a second wall, said first wall being approximately 0.3–0.4 millimeters thick and having an inner surface facing said stator and extending radially from said annular hub and parallel to said base plate, said second wall having an inner surface and extending from an outer periphery of said first wall toward said base plate thereby enclosing said stator within said first wall, said second wall and said base plate; and an annular magnet having an inner surface and an adjacent upper surface facing away from said base plate, said annular magnet being fixed to said inner surface of said second wall, said annular magnet facing an outer periphery of said stator across a gap;

wherein an annular bent portion is formed in said first wall immediately adjacent to said annular magnet thereby creating an air gap which extends to said annular magnet and has a thickness defined as a distance between a plane including said upper surface of said annular magnet and said first wall, said air gap thickness being 0.1–0.4 millimeters, and wherein a radial distance from said shaft to said bent portion is equal to a radial distance from said shaft to said inner surface of said annular magnet.

* * * * *